INVENTOR.
ROBERT B. BUCHNER
BY
Frank R. Trifari
AGENT

July 29, 1969 R. B. BUCHNER 3,458,663

SWITCHING NETWORKS

Filed Oct. 25, 1966 3 Sheets-Sheet 2

INVENTOR.
ROBERT B. BUCHNER
BY
Frank R. Trifari
AGENT

INVENTOR.
ROBERT B. BUCHNER
BY
Frank R. Trifari
AGENT

United States Patent Office 3,458,663
Patented July 29, 1969

3,458,663

SWITCHING NETWORKS

Robert Bertold Buchner, Hilversum, Netherlands, assignor, by mesne assignments, to U.S. Philips Corporation, New York, N.Y., a corporation of Delaware Filed Oct. 25, 1966, Ser. No. 589,344
Claims priority, application Netherlands, Oct. 26, 1965, 6513800
Int. Cl. H04m *3/00*
U.S. Cl. 179—18 5 Claims

ABSTRACT OF THE DISCLOSURE

In a multistage switching network using end-to-end marking, a group of coupling devices is associated with each switching stage. The connecting conductors interconnecting the stages include electronic switches. The coupling devices are connected to condition the electronic switches which have access to one marked end of the network so that a growing current can flow in marked electronic switches that have access to the other marked end of the network. Mutual cut-off devices are provided interconnecting the coupling devices of each group in order that all coupling devices but one are cut-off.

This invention relates to switching networks for automatic communication exchanges, more particularly automatic telephone exchanges, comprising a plurality of switching stages connected together by intermediate lines and each including a plurality of crosspoint switches, and comprising a network of connecting conductors pertaining to the intermediate lines and connected to coupling matrices associated with the cross-point switches, having a plurality of inputs and outputs and, situated at the crossings thereof, cross-point coupling members which are responsive to a connecting current and each of which controls a plurality of cross-point contacts, wherein for switching a connecting path between a starting point and an end point of the switching network, the relevant starting and end points are marked.

An object of the invention is, in order to increase the reliability of operation, to provide an entirely new conception of such a switching network with so-called starting and end marking while retaining the extremely fast operation thereof and without previously searching for paths.

A switching network according to the invention is caracterized in that it comprises successively coupling devices each connected to a group of connecting conductors and to electronic switches included in these conductors, mutual cut-off devices each connected to a group cut-off devices, means for conditioning the coupling devices which are accessible from the end point through free connecting conductors, comprising a source of conditioning signals which is connected to the end point, means for deriving a conditioning signal from the connecting conductors and feeding this signal to the associated coupling device, each coupling device including means which, upon reception of a conditioning signal, supply a control current to the associated electronic switches to make them suitable for transmitting the conditioning signal, means for simultaneously switching-on the conditioned coupling devices, comprising a source of connecting currents which is connected to the starting point, means for deriving part of the working current flownig through the connecting conductors and for supplying the same to the associated coupling device, which means are active only if the associated coupling device has been conditioned, each coupling device including means which, upon reception of a working current, make the coupling device operative in a cumulative manner, each cut-off device including means for deriving a cut-off signal from each coupling device which has been made operative and for feeding this signal to all the other coupling devices, each coupling device including means for cutting-off this device upon reception of a cut-off signal in such manner that in each group only one coupling device can become operative and all the other coupling devices of the same group are cut-off, each coupling device including means for supplying a control current to the associated electronic switches to make them suitable for conducting a connecting current of suitable strength for operating the cross-point coupling members, which means are active only if the coupling device is operative.

In order that the invention may be readily carried into effect, it will now be described in detail, by way of example, with reference to the accompanying diagrammatic drawings, in which.

Figure 1:
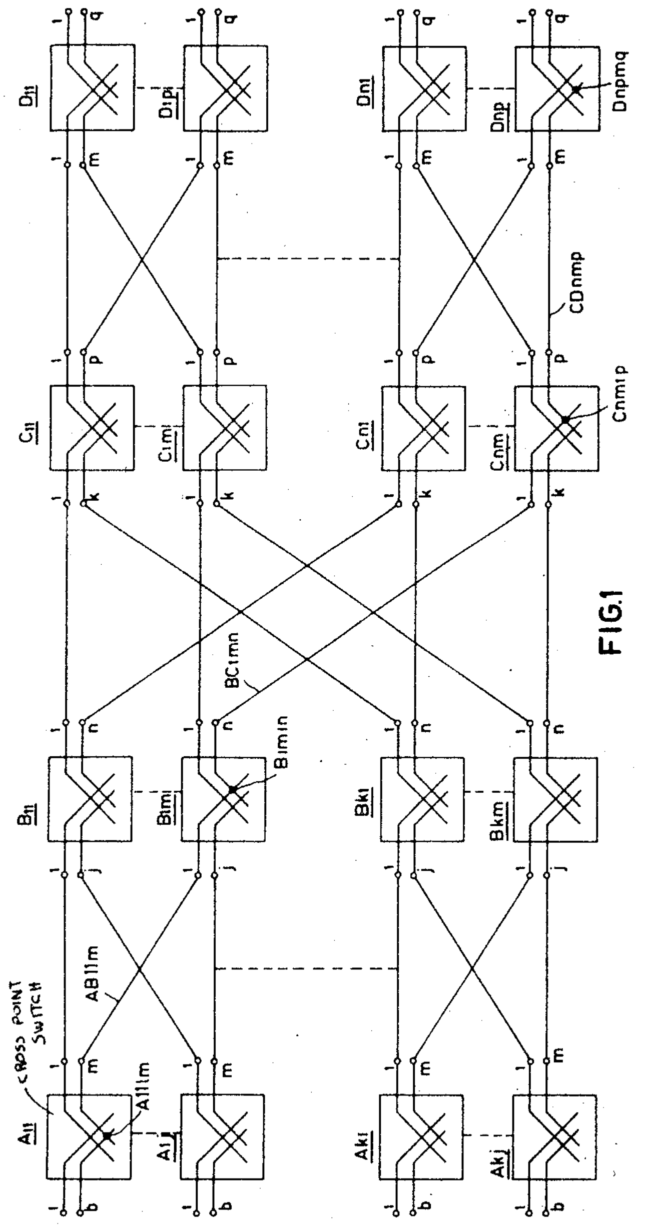
FIGURE 1 shows a grouping diagram of a simple four-stage switching network.

The invention will be described with reference to a simple switching network having four switching stages A, B, C and D, the grouping diagram of which is shown in FIGURE 1. Each switching stage comprises a plurality of identical cross-point switches subdivided into groups and each having a plurality of inputs and outputs. Thus, the switching stage A comprises $k$ groups each of cross-point switches A11–A1$j$; . . .; A$k$1–A$kj$ each having 1 inputs and $m$ outputs. The inputs of the cross-point switches of switching stage A, hereinafter referred to as A-switches, constitute also the inputs of the switching network. Each A-switch of a given group of A-switches is connected through an intermediate line to each B-switch of a corresponding group of B-switches. Consequently, the switching stage B comprises $k$ groups of $m$ B-switches each having $j$ inputs. These are the B-switches B11–B1$m$; . . .; B$k$1–B$km$. A group of A-switches and the associated group of B-switches are together referred to as an AB-group. The outputs of the D-switches constitute also the outputs of the switching network. The structure of the switching stages D and C is similar to that of the switching stages A and B. In this case, a group of D-switches and the associated group of C-switches together form a CD-group. Each B-switch is connected through an intermediate line to one C-switch of each CD-group. Consequently there are as many CD-groups as a B-switch has outputs $n$. Further, each C-switch is connected through one intermediate line to a B-switch of each AB-group. Consequently each C-switch has as many outputs as there are AB-groups $k$ and there are $m$ C-switches in a CD-group. Owing to this grouping each A-switch has access to each B-switch of the same AB-group in each case via one intermediate line and each AB-group has access to each CD-group via *m* intermediate lines. In this group each C-switch has access to each D-switch in each case via one intermediate line.

The cross-point switches are shown only diagrammatically in FIGURE 1, the intermediate lines being shown only for a small part for the sake of clarity. The cross-point switches may be formed, for example, as cross-coil switches or as switches having individual cross-point coils. The present example employs the last-mentioned type of cross-point switches. At the cross-points of each cross-point switch, such as, for example, at the cross-point A11*lm* between the 1$^{th}$ input and the *m*$^{th}$ output of switch A11, there are several cross-point contacts which serve to connect the speech and signalling wires. The said cross-point contacts are formed, for example, as reed contacts which are enclosed in sealed protective glass tubes. A complete cross-point element comprises, for example, three such reed contacts and a common coil which surrounds the protective tubes.

Figure 2:
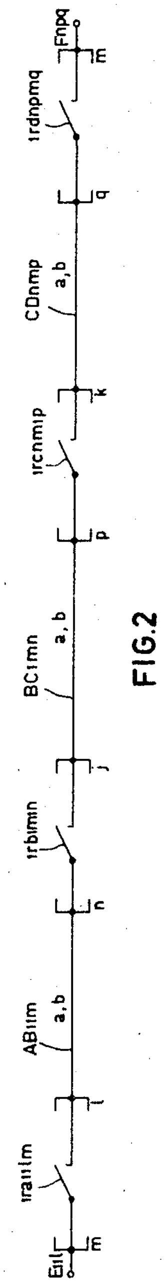
FIGURE 2 shows the course of the speech conductors of a connecting path through the switching network.

FIGURE 2 shows the course of the speech conductors between an input and an output of the switching network of all possible connecting paths through the switching network one determined connecting path being shown. The two speech conductors extend in parallel with each other and each have the course shown in FIGURE 2. The connecting path shown by way of example extends from an input E11*l* to an output F*npq* of the switching network. The input E11*l* is connected to the 1$^{th}$ input of switch A11 and the output F*npq* is connected to the *q*$^{th}$ output of a switch *Dnp*. The connecting path extends from from switching network E11*l* through the cross point A11*lm* to the *m*$^{th}$ output of switch A11. The speech conductor shown extends via a cross-point contact 1*ra*11*lm*, which lies at the cross-point A11*lm* between the 1$^{th}$ input and the *m*$^{th}$ output of switch A11. The multiple signs shown to the left and to the right of the cross-point contact indicate that in situ a plurality of cross-point contacts are connected, their numbers being denoted by the characters added to the multiple signs. From the *m*$^{th}$ output of switch A11 a conductor extends from intermediate line AB11*m* to the 1$^{th}$ input of switch B1*m*. From this input the speech conductor shown extends via a cross-point contact B1*m*1*n* to the *n*$^{th}$ output, from which a conductor of intermediate line BC1*mn* leads to the 1$^{th}$ input of switch Cnm. The speech conductor here extends via a cross-point contact 1*rcnm*1*p* and extends further via a cross-point contact 1*rdnpmq* to output F*npq* of the switching network. The connecting path is shown in the rest condition, which is indicated by the open positions of all the cross-point contacts located in the connecting path.

Figure 3:
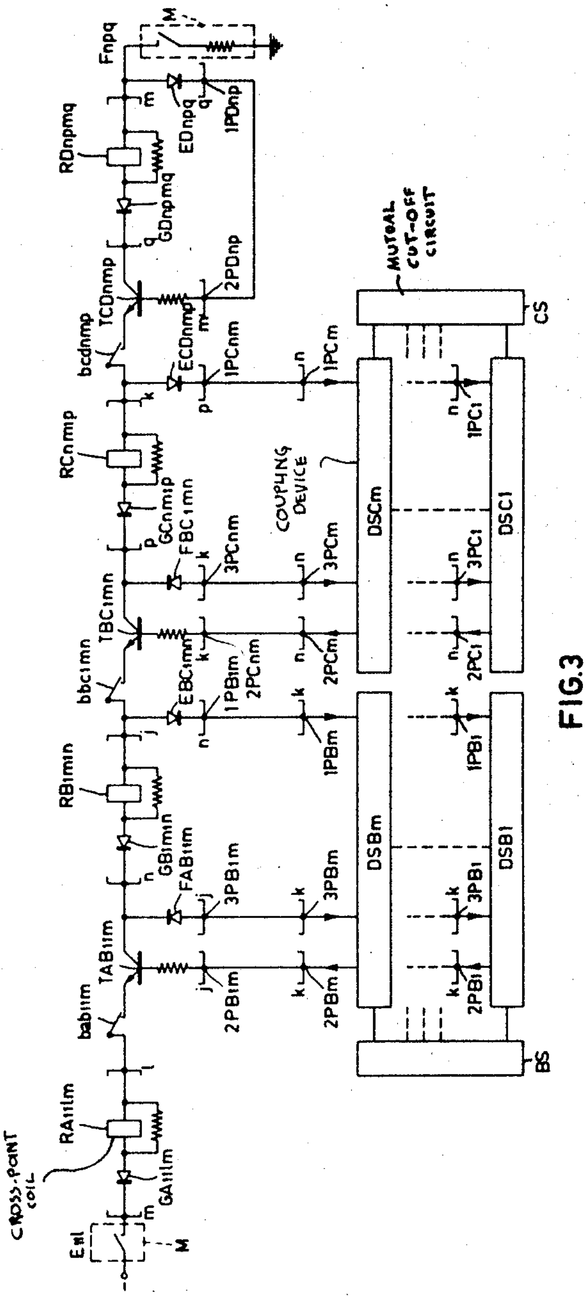
FIGURE 3 shows the diagram of a switching network according to the invention.

For switch a connecting path, use is made of a network of connecting conductors which is built up in accordance with the grouping diagram of FIGURE 1 and which lies over the network of speech conductors. Of this switching network only an extract is shown in FIGURE 3, similarly as of the speech network in FIGURE 2. This extract of the switching network relates to the same connecting path as FIGURE 2. Consequently the connecting conductors shown extend in parallel with the speech conductors shown in FIGURE 2. The connecting conductors include holding contacts which characterize the free or busy condition of the relevant intermediate lines. Said holding contacts are closed when the relevant intermediate lines are free. Thus, for example, the connecting conductor of intermediate line AB11*m* includes a holding contact *bab*11*m*, which is closed when the intermediate line is free. Furthermore, each intermediate line includes the emitter-collector path of an *npn*-type transistor, referred to hereinafter as "coupling transistor." The emitters and collectors of the coupling transistors are directed towards the inputs and outputs respectively of the switching network, in order to permit a current flow from an ouput to an input of the switching network. Thus, for example, the connecting conductor of intermediate line AB11*m* includes the emitter-collector path of a coupling transistor TAB 11*m* the emitter and collector of which are directed respectively to an input E11*l* and an output F*npq* of the switching network. The connecting conductor shown in FIG. 3 extends from switching-network input E11*l* via a cross-point coupling member comprising the series-combination of a decoupling diode GA11*lm* and a cross-point coil RA11*lm*, to the *m*$^{th}$ ouput of switch A11. The multiple signs shown to the left and to the right of the coupling member indicate that in situ a plurality of cross-point coupling members are connected. The said cross-point coupling member is situated at the cross-point A11*lm* between the 1$^{th}$ input and the *m*$^{th}$ output of switch A11. The cross-point coil RA11*lm* comprises the cross-point contacts present at the same cross-point, inter alia the cross-point contact 1*ra*11*lm* shown in FIGURE 2, and closes these cross-point contacts when a current of a given minimum strength, referred to as the energizing current, passes through the coil. The decoupling diodes of the coupling members are connected in the same sense as the coupling transistors and ensure that a current in the switching network which is supplied to an output of a switch and removed from an input thereof can flow only via the coupling member present at the cross-point between the said input and output.

The complex of coupling members of a cross-point switch is built up in the form of coordinates similarly as the complex of cross-point contacts included in the network of the speech conductors. Dependent upon this structure in the form of coordinates or a matrix, the portion of a cross-point switch located in the network of connecting conductors is referred to as "coil matrix" and the portion located in the network of the speech conductors is referred to as "contact matrix." The outputs of each coil matrix in the switching stages B, C and D are each connected via a decoupling diode to a first multiple point pertaining to the relevant cross-point switch. Thus, for example, the *q*$^{th}$ output of a coil matrix D*np*, to which a switching-network output F*npq* is connected, is coupled via a decoupling diode ED*npq* to the first multiple point 1PD*np*. Similarly, the *p*$^{th}$ output of a coil matrix C*nm* is connected via diode ECD*nmp* to the first multiple point 1PC*nm* and the *n*$^{th}$ output of a coil matrix B1*m* is connected via diode EBC1*mn* to the first multiple point 1PB1*m*. Further, the bases of the coupling transistors which are connected to the inputs of the same coil matrix are each connected via a base resistor to a second multiple point pertaining to the relavent cross-point switch. Thus, for example, the base of coupling transistor TCD*nmp*, which is connected to the *m*$^{th}$ input of *m* coil matrix D*np*, is coupled to the second multiple point 2PD*np*. Similarly, the base of coupling transistor TBC1*mn* is connected to the second multiple point 2PC*nm* and the base of coupling transistor TAB11*m* is connected to the second multiple point 2PB1*m*. The inputs of each coil matrix in the switching stages B and C are each connected via a decoupling diode to a third multiple point pertaining to the relavent cross-point switch. Thus, for example, the 1$^{th}$ input of coil matrix C*nm* is connected via decoupling diode FBC1*mn* to the third multiple point 3PC*nm*. Similarly the 1$^{th}$ input of coil matrix B1*m* is connected via decoupling diode FAB11*m* to the third multiple point 3PB1*m*.

In switching stage D the first multiple point of each D-switch is connected directly to the second multiple point thereof. In the switching stages D and C, the multiple points of the B and C-switches are multipled via the AB and CD-groups respectively, The first, second and third multiple points of the cross-point switches which occupy corresponding positions in the various AB and CD-groups being connected together and connected to a first, a second and a third group multiple point respectively. Thus, for example, the second multiple point 2PB1*m* of cross-point switch B1*m* is connected, together with the second multiple points of the cross-point switches B2*m*, B3*m*, . . . B*km*, to the second group multiple point PB*m*. Similarly, the first multiple point 1PB1*m* is connected to the first group multiple 1PB*m* and the third multiple point 3PB1*m* is connected to the third group multiple point 3PB*m*. In switching stage C, the multiple points 1PC*nm*, 2PC*nm* and 3PC*nm* of cross-point switch C*nm* are connected in the same manner to the first group multiple point 1PC*m*, the second group multiple point 2PC*m* and the third group multiple point 3PC*m* respectively.

In the switching stages B and C, the group multiple points pertaining to the same group of B and C-switches are connected to the same coupling device. Thus, for example, in switching stage B the group multiple points 1PB*m*, 2PB*m* and 3PB*m* pertaining to the group of cross-point switches B1*m*, B2*m*, B3*m*, . . . B*km* are connected to the coupling device DSB*m*. In the present switching network the number of coupling devices per switching stage is equal to the number of cross-point switches *m* in an AB group or CD group. The first and third group multiple points of each group of cross-point switches are connected to a first and a second input respectively of the associated coupling device and the second group multiple point is connected to an output thereof. Of the group of coupling devices of switching stages B and C, respectively, the first and the last are shown in a block diagram in FIGURE 3. The coupling devices of switching stages B and C are connected together by means of mutual cut-off circuits BS and CS respectively. These cut-off circuits ensure that in each group of coupling devices no more than one coupling device can reach the operating condition.

For switching a connecting path between the input E11*l* and the output Fnpq of the switching network, a marker M applies a negative switching potential to the input and, via a current limiting resistor, earth potential to the output of the switching network. Each combination of free connecting conductors through which the output of the switching network can reach the input thereof corresponds to a free connecting path and can fundamentally be used for conducting a switching current. A suitable combination of connecting conductors is formed, for example, by the connecting conductors of the intermediate lines AB11*m*, BC1*mn* and CD*nmp* shown in FIGURE 3. The coupling transistors which are situated in a suitable combination of connecting conductors can convey a current through their collector-emitter paths only if suitable control currents are supplied to the bases thereof. The control current for the coupling transistors which are connected to the inputs of the same D-switch is derived from the marked output thereof via the direct connection between the first and second multiple points of the relevant D-switch. The marked switching-network output F*npq* has access via the free connecting conductors connected to switch D*np* and the coupling transistors included therein, to outputs of switching stage C and the first inputs of the group of coupling devices DSC1. . . . . DSC*m* which are connected to the said outputs. The coupling devices of this group which are accessible to the marked switching-network output receive a conditioning current therefrom on their first inputs. Thus, for example, a conditioning current flows from switching-network output F*npq* via the cross-point D*npmq* to the $m^{th}$ input of coil matrix D*np* and thence via the collector-emitter path of coupling transistor TCD*nmp* to the $p^{th}$ output of coil matrix C*nm* and thence via decoupling diode ECD*nmp* to the first input 1PC*m* of coupling device DSC*m*. The conditioning current has a value which is much less than the switching current and leaves the cross-point coupling members of coil matrix D*np* in the rest condition. The coupling devices of switching stage C which receive a conditioning current are in the desired condition for supplying a control current to the output and the coupling transistor connected thereto. The marked switching-network output F*npq* thus has access via free connecting conductors and the coupling transistors included therein to outputs of switching stage B and the first inputs of the group of coupling devices DSB1 . . . DSB*m* which are connected to the said outputs. The coupling devices of this group which are accessible to the marked switching-network output are in the desired condition for supplying a control current in a similar manner as the coupling devices of switching stage C. Thus the marked output of the switching network also has access to outputs of switching stage A. The time needed for obtaining access to outputs of switching stage A after the marking of the switching-network output is extremely short and may be regarded as a condition of the switching network which exists immediately after the output thereof has been marked. The total series-resistance of a suitable combination of connecting conductors is comparatively low and the current flowing through them after the input and output of the switching network have been marked will increase to a comparatively high value. As a rule, a plurality of suitable combinations of connecting conductors are located between the input and output of the switching network. The operation of the coupling devices is such that a switching current of a strength suitable for switching the corresponding connecting path can flow through only one of the suitable combinations of connecting conductors with exclusion of all the other suitable combinations.

After the input and output of the switching network has been marked, a growing current starts to flow through all the suitable combinations of connecting conductors. Part of this growing current is derived by the second inputs of the coupling devices which are accessible to the input of the switching network. Thus, for example, a current is derived by the second input 3PB*m* of coupling device DSB*m* through decoupling diode FAB11*m* and by the second input of 3PC*m* of coupling device DSC*m* via decoupling diode FBC1*mn*. The coupling devices which have been conditioned for supplying a control current by the marked output of the switching network and the second inputs of which are accessible to the marked inputs of the switching network start simultaneously in the two switching stages to supply a growing control current for assisting the growing current which flows through the connecting conductors. Because of the mutual cutting-off of the coupling devices of each switching stage, eventually only one coupling device of each group can continue to supply the growing control current. All the other coupling devices of the same group are cut-off by this one coupling device and provide a cut-off signal at their outputs. A coupling device can continue to supply a growing control current only if a growing current is derived by the second input. This is the case only if in the preceding switching stages the passage of current to the said input from the marked input of the switching network is not interrupted. The result is that only such a combination of coupling devices from the various switching stages continues to supply a growing control current (which current eventually reaches a final value) that the continuity of the current from the output to the input of the switching network is maintained. Let it be assumed that the coupling device DSB*m* in switching stage B and the coupling device DSC*m* in switching stage C are the remaining operative coupling devices. In the switching stages B and C, a control current is then supplied to the bases of all the coupling transistors which are connected to the second group multiple points 2PB*m* and 2PC*m*. In switching stage D, a control current is supplied directly from the output F*npq* to the bases of the control transistors which are connected to the second multiple point 2PD*np*. Of all these coupling transistors only the coupling transistors TAB11*m*, TBC1*mn*, and TCD*nmp* as shown lie in a suitable combination of connecting conductors. The result is that, after the input and output of the switching network have been marked and the coupling devices DSB*m* and DSC*m* have become operative, a switching current of suitable strength starts to flow only through the illustrated connecting conductors pertaining to the intermediate lines AB11*m*, BC1*mn*, and CD*nmp*. This switching current simultaneously energises the coupling members present at the cross-points D*npmq*, C*mnip*, B1*m*1*n* and A11*lm* so that the corresponding cross-point contacts, inter alia the cross-point contacts 1*rdnpmq*, 1*rcnmlp*, 1*rblmln* and 1*ra*11*lm*, are closed. The switching of the connecting path between the input E11*lm* and the output F*npq* of the switching network is thus terminated.

The connecting path may fundamentally be held via a path through a network of holding conductors which is built up in a similar manner as the switching network and which includes holding relays connected to the holding conductors and controlling the holding contacts included in the connecting conductors. The network of the holding conductors may also be combined with the network of the connecting conductors, such as has been described in the prior U.S. patent application S.N. 507,877. In the combined network described in this application, one cross-point coil is used at each cross-point, said cross-point coil having both an energizing function and a holding function. Furthermore, instead of employing the mechanical holding contacts, use is made of transistors through which the holding current flows and which thus cut-off the associated coupling transistors.

In switching networks of a more general nature the intermediate lines between the switching stages B and C extend via a grading field having a number of inputs which generally differs from the number of outputs. For reasons of traffic distribution multiplings between the AB-group are effected in this intermediate divider, whilst also the through-connection with the CD groups is established in it. The multipling of the coupling devices via the cross-point switches of the AB and CD-groups, respectively, as shown in FIGURE 3 may remain unchanged if the condition is fulfilled that no B-switch is connected to one C-switch via more than one intermediate line. If this is not the case, the coupling transistors pertaining to intermediate lines which extend in parallel have to be connected to outputs of different coupling devices.

Figure 4:
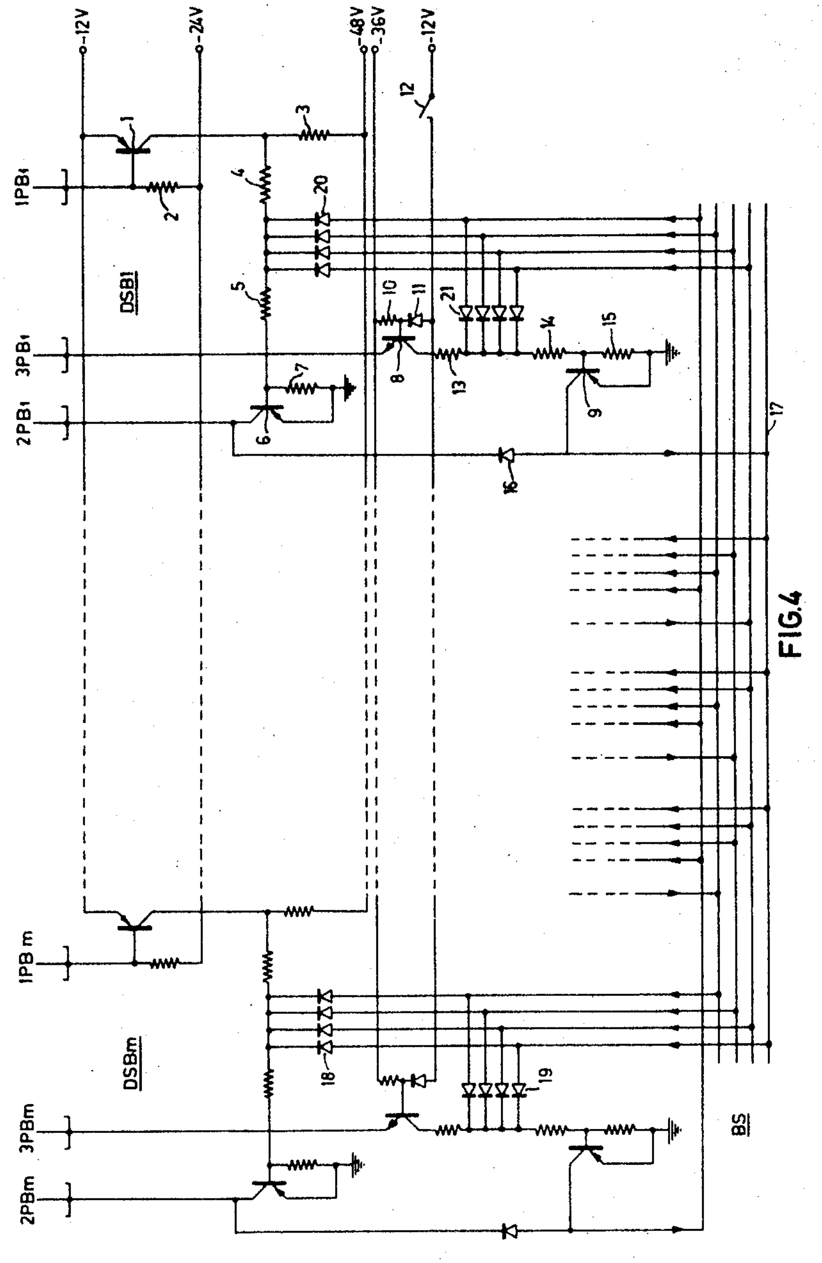
FIGURE 4 shows the detail diagram of a plurality of coupling devices which are connected together.

The operation of the coupling devices will be explained further with reference to an embodiment as shown in FIGURE 4. This figure shows in detail the first and fifth coupling devices of a group of five coupling devices. The coupling devices which are located between them are shown in broken lines. The coupling devices are indicated in the same manner as those of switching stage B. The coupling devices are identical with one another and the description corresponds substantially to that of coupling device DSB1. Each coupling device comprises a gating transistor 1, the base of which is connected through a base resistor 2 to a —24 volt supply line and the emitter of which is connectd to a —12 volt supply line. The collector of gating transistor 1 is connected through a collector resistor 3 to a —48 volt supply line and is connected through the series-combination of resistors 4 and 5 to the base of a control transistor 6, the emitter of which is connected to earth and the base of which is connected to earth through a resistor 7. The first group multiple point 1PB1 is connected to the base of gating transistor 1 and the scond group multiple point 2PB1 is connected to the collector of control transistor 6. The other first and second group multiple points are connected to the associated coupling devices in a similar manner. The gating transistor 1 is greatly conducting in the rest condition, its collector thus having a potential of substantially —12 volts. This potential is divided over the resistors 4, 5 and 7 so that control transistor 6 is cut-off. Further, each coupling device includes a test transistor 8 and an associated feedback transistor 9. The base of test transistor 8 is connected through a base resistor 10 to a —36 volt supply line and is connected through a decoupling diode 11 to a line which may be connected through a contact 12 to a —12 volt supply source. The collector of test transistor 8 is connected to earth through the series-combination of resistors 13, 14 and 15. The base of feedback transistor 9 is connected to the junction point of the resistors 14 and 15, while its emitter is connected to earth. The collector of feedback transistor 9 is connected via a decoupling diode 16 to the collector of control transistor 6. Further, a blocking line 17 is connected to the collector of feedback transistor 9. This line is connected through a decoupling diode to the junction point between the resistors 4 and 5 and via a decoupling diode to the junction point between the resistors 13 and 14 of each other coupling device. In coupling device DSB*m*, said decoupling diodes are indicated by the reference numerals 18 and 19. A similar cut-off line emerges from each other coupling device and is coupled to each other coupling device in a similar manner. In coupling device BSB1, the decoupling diodes connected to the cut-off line of coupling device DSB*m* are indicated by the reference numerals 20 and 21. In the rest condition (contact 12 open) test transistor 8 is cut-off and so is feedback transistor 9. In this connection it is to be noted that the transistors 8 and 9 are of opposite conductivity types so that transistor 9 can convey current only if transistor 8 conveys current.

When the first group multiple point 1PB1 is accessible to the marked output of the switching network, the potential thereof is higher than —12 volts and gate transistor 1 is cut-off. The current which thus flows from the first group multiple point 1PB1 through resistor 2 to the —24 volt supply line is the conditioning current referred to hereinbefore. Control transistor 6 is conducting under control of a base current derived from the —48 volt supply line via the collector resistor 3 of gate transistor 1 and the resistors 4 and 5. The switching contact 12 is closed before or at the same time as the input and output of the switching network are marked. When the third group multiple point 3PB1 is accessible to the input of the switching network and control transistor 6 conveys current, the potential thereof is lower than —12 volts. Test transistor 8 is then conducting as also feedback transistor 9. The collector current of feedback transistor 9 is partly supplied to the second multiple point 2PB1 via the diode 16. This part of the collector current there fulfills the function of a control current for the coupling transistors connected to the second group multiple point. An increase in control current results in an increasing current through test transistor 8 and hence in an increasing current through feedback transistor 9. The result is that the control current increases in a cumulative manner. Another part of the collector current of feedback transistor 9 is supplied via cut-off line 17 to the other coupling devices exerting therein a blocking action on the control and feedback transistors. As soon as the control current starts to increase cumulatively, the potential of the first group multiple point 1PB1 falls below —12 volts and the gate transistor 1 again becomes greatly conducting. Gate transistor 1 and control transistor 6 thus serve only for the temporary conditioning of the coupling devices in such manner that only the coupling devices which are accessible from both the output and the input of the switching network can become operative in a cumulative manner. The proportioning of the coupling devices is such that eventually only one coupling device can continue to supply a growing control current, which at last reaches a final value. After the operation of switching a connecting path is terminated the switching contact 12 is opened and the coupling devices return to their rest conditions.

In order to avoid that preferably always a specific coupling device, namely the most sensitive, becomes operative the —48 volts from the —48 volt supply line may be applied via a divider circuit alternately to the collectors of the gate transistors 1. Thus, only one coupling device of the group is sensitive at a time. This step may be used in one of the two groups of coupling devices shown in FIGURE 3, in order to obtain a better distribution of load.

Of a coupling device obtained in practice, the following illustrative data may be given:

| Transistors: | Type |
|---|---|
| 1 | 2N2905A |
| 6 | 2N2905A |
| 8 | 2N930 |
| 9 | 2N2905A |

| Resistors: | Value, ohms |
|---|---|
| 2 | 12,000 |
| 3 | 5,000 |
| 4 | 20,000 |
| 5 | 10,000 |
| 7 | 1,000 |
| 13 | 5,000 |
| 14 | 5,000 |
| 15 | 5,000 |

What is claimed is:

1. A switching circuit for establishing a connection between one of a plurality of starting points and one of a plurality of end points, comprising a plurality of coupling matrices arranged in a plurality of sequential groups between said starting and end points, each coupling matrix having a plurality of inputs and a plurality of outputs and comprising a plurality of coupling members for interconnecting each input and output of the respective matrix, a plurality of connecting conductors for interconnecting the outputs of the matrices of each group to the inputs of the matrices of the next succeeding group whereby a plurality of possible connecting paths exist between said starting and end point, each connecting conductor comprising an electronic switch having a control terminal, means applying a marking potential between said one starting and end points, a plurality of coupling devices arranged in groups with each group of coupling devices corresponding to a group of matrices and each coupling device of a group of coupling devices corresponding to a plurality of coupling members, each coupling device comprising means responsive to a conduction path between said one end point and an output of a coupling matrix to which a corresponding coupling member is connected for conditioning the electronic switch connected to the input of said coupling matrix connected to said corresponding coupling member for passing conditioning current, whereby each conditioned electronic switch that has a conduction path to said one starting point passes a working current, each coupling device further comprising means responsive to the flow of working current through the electronic switch connected thereto for increasing the flow of current through said electronic switch, a cut-off device means for each group of coupling devices, said cut-off device means comprising means for deriving a cut-off signal from each coupling device of the respective group of coupling devices which is connected to an electronic switch passing working current, and means for applying said cut-off signal to the other coupling devices of the group whereby only one electronic switch connected to a coupling device of each group can remain conductive.

2. The switching circuit of claim 1 in which said coupling members are current responsive members of cross-point switches in an automatic communication exchange of the type having a plurality of switching stages arranged between a plurality of input lines and a plurality of output lines and interconnected by a plurality of intermediate lines, and each switching stage includes a plurality of said cross-point switches, and wherein each said coupling matrix corresponds to one of said switching stages of said exchange and each connecting conductor corresponds to a separate intermediate line of said exchange.

3. The switching circuit of claim 1 in which said coupling devices comprise a first input circuit connected to an output of the corresponding matrix, a second input circuit connected to the control terminal of the electronic switch connected to the last mentioned input, whereby a part of said working current flowing in said electronic switch flows to said second input circuit, said coupling devices comprising means responsive to a conduction path output to which the respective first input circuit is connected and said one end point for applying a first control signal to the respective output terminal, means responsive to the flow of working current to the respecive second input circuit for applying a second control signal to the respective output terminal, whereby said first and second control signals operate in a cumulative manner to increase the conductivity of the corresponding electronic switch.

4. The switching circuit of claim 1 in which said electronic switches are transistors with emitter collector paths connected in series in the respective connecting conductors, and said control terminals are connected to the base of said transistors.

5. The switching circuit of claim 3 in which said control devices each comprise a control device connected to said output terminal, a gate device connected to said first input circuit for controlling said control device to apply a conditioning potential to said output terminal in response to the application of said marking potential to said first input circuit, and a positive feedback circuit responsive to application of working current to said second input circuit for producing an increasing current flow in the corresponding electronic switch.

References Cited

UNITED STATES PATENTS 3,324,249 6/1967 Cotroneo et al.

KATHLEEN H. CLAFFY, Primary Examiner

W. A. HELVESTINE, Assistant Examiner